US007555486B2

(12) United States Patent
Venguerov

(10) Patent No.: US 7,555,486 B2
(45) Date of Patent: Jun. 30, 2009

(54) DATA STORAGE AND RETRIEVAL SYSTEM WITH OPTIMIZED CATEGORIZATION OF INFORMATION ITEMS BASED ON CATEGORY SELECTION

(75) Inventor: Mark Venguerov, Dun Laoghaire (IE)

(73) Assignee: PI Corporation, Kirkland, WA (US)

( * ) Notice: Subject to any disclaimer, the term of this patent is extended or adjusted under 35 U.S.C. 154(b) by 115 days.

(21) Appl. No.: 11/205,630

(22) Filed: Aug. 17, 2005

(65) Prior Publication Data

US 2006/0161570 A1 Jul. 20, 2006

Related U.S. Application Data

(63) Continuation-in-part of application No. 11/039,191, filed on Jan. 20, 2005, now Pat. No. 7,412,452.

(51) Int. Cl.
*G06F 17/30* (2006.01)
(52) U.S. Cl. .............. 707/100; 707/3; 707/10; 707/102; 707/103 R; 707/104.1
(58) Field of Classification Search .............. 707/3, 707/100, 10, 102, 103 R, 104.1
See application file for complete search history.

(56) References Cited

U.S. PATENT DOCUMENTS 5,717,925 A * 2/1998 Harper et al. ............... 707/102
5,819,258 A * 10/1998 Vaithyanathan et al. ........ 707/2
5,862,325 A * 1/1999 Reed et al. .................. 709/201
5,878,423 A * 3/1999 Anderson et al. ........... 707/100
5,920,864 A * 7/1999 Zhao ............................ 707/10
5,943,670 A * 8/1999 Prager ........................... 707/5
6,055,540 A * 4/2000 Snow et al. ............. 707/103 R
6,272,495 B1 * 8/2001 Hetherington .............. 707/101
6,385,602 B1 * 5/2002 Tso et al. ........................ 707/3
2002/0059210 A1 * 5/2002 Makus et al. .................. 707/3
2002/0107840 A1 * 8/2002 Rishe ............................ 707/3
2005/0044089 A1 * 2/2005 Wu et al. ..................... 707/100

* cited by examiner

*Primary Examiner*—Khanh B Pham
*Assistant Examiner*—Syling Yen
(74) *Attorney, Agent, or Firm*—David A. Dagg

(57) ABSTRACT

A data storage and retrieval system with optimized categorization of information items using intelligent category selection, based on the information items that are to be checked for category membership. The set of categories for which an information item may be a candidate member is determined, and only that set of categories is checked for membership of the information item during the categorization process. The determination of which categories an information item can be a candidate member of is based on the properties defined for that information item, which are compared to the properties checked for category membership of specific categories. A category index tree may be built and maintained to support efficient determination of which categories a given information item may be a candidate member of. The efficiency of categorization provided by the disclosed techniques enables the disclosed system to maintain category definitions indefinitely with minimal performance impact.

10 Claims, 7 Drawing Sheets

DATA STORAGE AND RETRIEVAL SYSTEM WITH OPTIMIZED CATEGORIZATION OF INFORMATION ITEMS BASED ON CATEGORY SELECTION

CROSS REFERENCE TO RELATED APPLICATIONS

The present application is a Continuation in Part under 35 U.S.C. 120 of prior application Ser. No. 11/039,191, entitled "Data Storage and Retrieval System with Intensional Category Representations to Provide Dynamic Categorization of Information Items", filed Jan. 20, 2005, all disclosures of which are hereby included by reference herein.

FIELD OF THE INVENTION

The present invention relates generally to the field of information storage and retrieval, and more specifically to an information storage and retrieval system with optimized categorization of information items based on intelligent category selection.

BACKGROUND OF THE INVENTION

Many types of software systems have been developed to meet the needs of users in the area of storing and retrieving information. Existing systems have enabled the storage and retrieval of large amounts of information. Performance is an important design consideration for such systems, and operations performed on stored information must be completed in the shortest possible time. It is therefore desirable that any processing steps performed either in response to, or preparation for, operations such as information storage, information retrieval, etc., be performed efficiently. However, in any information storage and retrieval system in which pieces of information must be categorized, system performance may be adversely impacted to a significant degree by the categorization process. This problem may be exacerbated when there are potentially large numbers of information categories and information pieces.

In addition, significant performance problems have been identified with regard to certain applications of existing relational and non-relational approaches to information storage and retrieval. First, it is well understood that the performance of relational database systems suffers when they are used to provide run-time flexibility in the information categories (i.e. tables) being stored. With regard to non-relational systems, including those involving the storage and retrieval of "semi-structured" information, such as XML (eXtensible Markup Language) documents, in some cases they may be more suitable to certain applications than relational systems for the storage, management, retrieval, and exchange of certain types of data. However, some areas that have traditionally been approached using non-relational systems are not cleanly reducible to a set of documents. As a result, existing "semi-structured" approaches are inadequate for a significant number of data storage and retrieval applications that are characterized by high variability of the structure of the stored information. Moreover, if it is desirable to share parts of documents in a document based system, there arises the problem of maintaining different document versions, and the resulting dependencies may become too complex for a system in which the documents are totally independent. File systems also suffer from the same problem, since they are based on an independent container model. The above shortcomings of existing relational and non-relational systems are apparent in a number of specific areas, including the storage of personal information, such as contact information.

For the above reasons and others, it would be desirable to have a new approach to categorizing information that provides improved performance in an information storage and retrieval system. The new system should perform efficiently in the face of large numbers of categories and amounts of information to be categorized. The system should be conveniently applicable to problems not amenable to solution using relational databases, or using existing non-relational systems, such as existing semi-structured document-based systems. The system should further be applicable to problems in which there is a highly variable information structure. Finally, the system should be conveniently applicable to storage, management, retrieval and exchange of various specific kinds of information, including personal information and/or information relating to information workers.

SUMMARY OF THE INVENTION

In order to address the above described and other shortcomings of existing systems, a data storage and retrieval system with optimized categorization of information items based on category selection is disclosed. In order to avoid the potential performance impact resulting from having to determine the membership of information items across a potentially large number of categories, the disclosed system intelligently selects categories that are checked to determine category membership. As a result, the number of categories checked is reduced significantly, improving categorization and overall system performance.

Category selection is performed based on information items that are to be checked for category membership. The set of categories for which an information item may be a candidate member is determined, and only that set of categories is checked for membership of the information item during the categorization process. This avoids having to check all possible categories for all information items. The determination of which categories an information item can be a candidate member of is based on the properties defined for that information item, as compared to the properties checked for category membership of specific categories. In one embodiment, a category index tree is built and maintained to support efficient determination of which categories a given information item may be a candidate member of. Further in an embodiment of the disclosed system, the efficiency of categorization provided by the disclosed techniques enables the disclosed system to never delete a category definition. Because category definitions are never deleted, if an application using the disclosed system stops using a previously defined category, and then resumes use of that category, the disclosed system need not redefine it, since its definition was not deleted upon the application ceasing use of it.

Thus there is disclosed a new approach to categorizing information that provides improved performance in an information storage and retrieval system. The new system performs efficiently in the face of large numbers of categories and large amounts of information to be categorized, and is applicable to problems not amenable to solution using existing relational databases or using certain existing non-relational systems. The disclosed system should is further applicable to problems in which there is a highly variable information structure, and convenient for use in the storage, management, retrieval and exchange of various specific kinds of information, including personal information and/or information relating to information workers.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
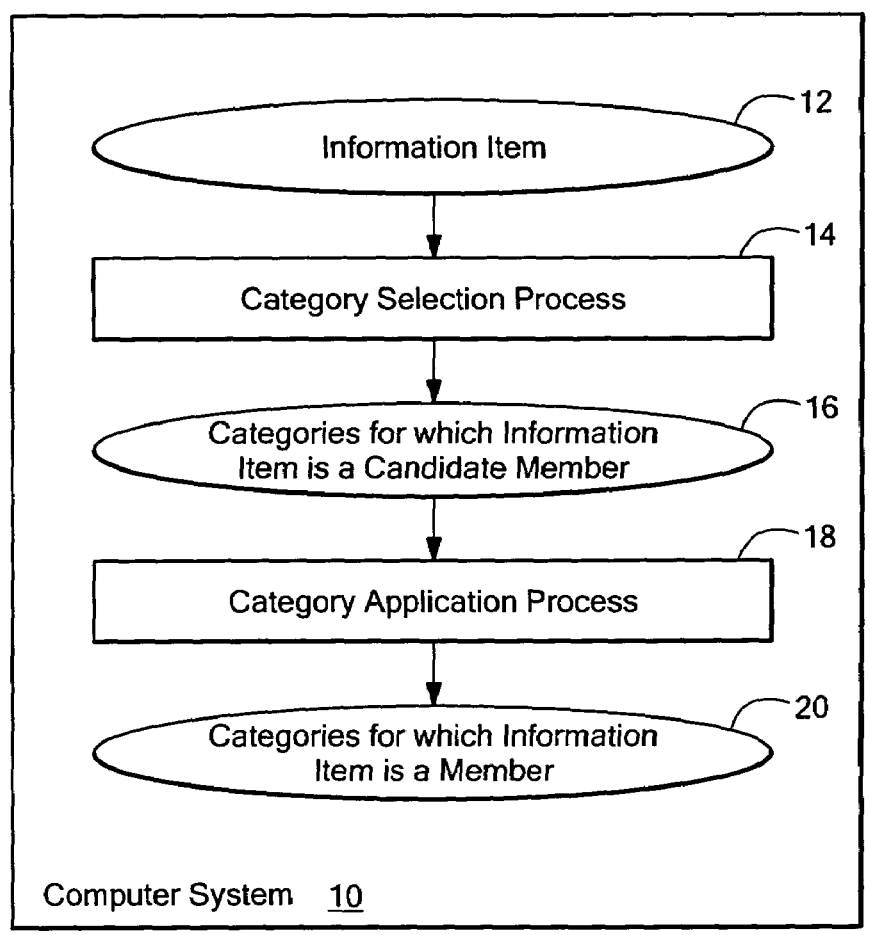
FIG. 1 is a block diagram showing software components in an illustrative embodiment of the disclosed system.

As shown in FIG. 1, an illustrative embodiment of the disclosed system operates using a number of software components executing on at least one computer system, shown for purposes of illustration as the computer system 10. The computer system 10 may, for example, include at least one processor, program storage, such as memory, for storing program code executable on the processor, and one or more input/output devices and/or interfaces, such as data communication and/or peripheral devices and/or interfaces. The computer system 10 may further be embodied as one or more physically distributed computer systems, such as one or more client and server computer systems, that are communicably connected by a data communication system, such as a Local Area Network (LAN), the Internet, or the like. The computer system 10 may further include appropriate operating system software.

As shown in FIG. 1, in an embodiment of the disclosed system includes a number of software components, shown for purposes of explanation as including an information item 12, a category selection process 14, a set of categories 16, for which the information item 12 is a candidate member, a category application process 18, and a set of categories 20 for which the category item 12 is a member. During operation of the embodiment shown in FIG. 1, the information item 12 is passed to the category selection process 14. The information item 12 may be an information that has been received, modified, created, or deleted. Receipt, modification, creation or deletion of the information item 12 may accordingly trigger operation of the category selection process 14. The category selection process 14 compares the set of properties associated with the information item 12 to the property set for each currently defined category. In the event that all the properties in the set of properties for a currently defined category are in the set of properties associated with the information item 12, then the category is added to the set of categories 16 for which the information item 12 is a candidate member.

The complete set of categories 16 for which the information item 12 is a candidate member is then passed to the category application process 18. The category application process 18 then determines which of the categories 16 the information item 12 is a member of. To do this, the category application process 18 checks the properties associated with the information 12 to determine whether conditions for membership in each individual one of the categories 16 are met. For example, each of the categories 16 may have an associated predicate that is applied to the properties associated with the information item 12 to determine whether the category includes information item 12 as a member. In this way, the category application process 18 generates the set of categories 20 for which the information item 12 is a member.

Figure 2:
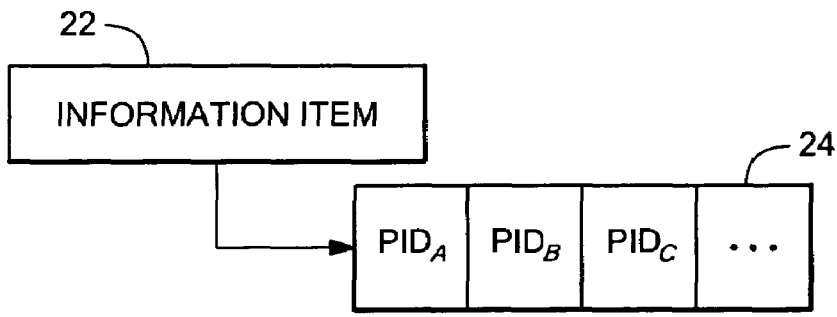
FIG. 2 is a block diagram showing an information item and related properties in an illustrative embodiment of the disclosed system.
Figure 3:
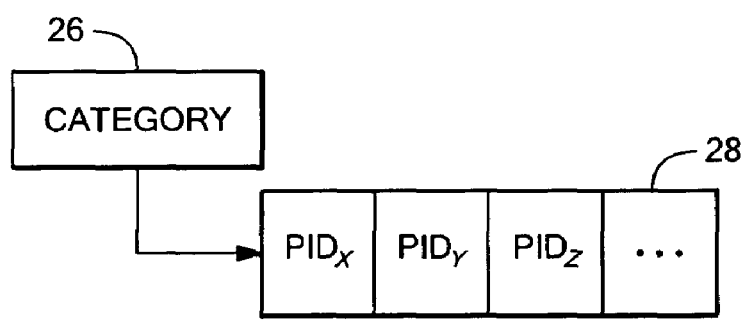
FIG. 3 is a block diagram showing an information category and related properties in an illustrative embodiment of the disclosed system.

FIG. 2 shows an information item 22 together with an associated set of properties 24. As shown in FIG. 2, the set of properties 24 for an information item may be stored as an ordered list of property identifiers, $PID_A$, $PID_B$, $PID_C$, etc. The properties 24 for the information 22 may be checked during a categorization process to determine whether the information item 22 is a member of one or more information categories. FIG. 3 shows an information category 26 together with an associated set of properties 28. As shown in FIG. 3, the set of properties 28 for an information category may be stored as an ordered list of property identifiers, $PID_X$, $PID_Y$, $PID_Z$, etc. The same global property ordering is applied to those properties stored in the information item property set 24 and those properties stored in the information category property set 28. This global property ordering may be based on any specific type of ordering that orders all properties in the system. For example, a global ordering of properties may be based on a lexigraphical ordering. Alternatively, properties may be ordered based on the order in which they were created. Any other type of ordering may also be used as appropriate for a given embodiment, so long as the ordering is shared between information item property lists and information category property lists.

Figure 4:
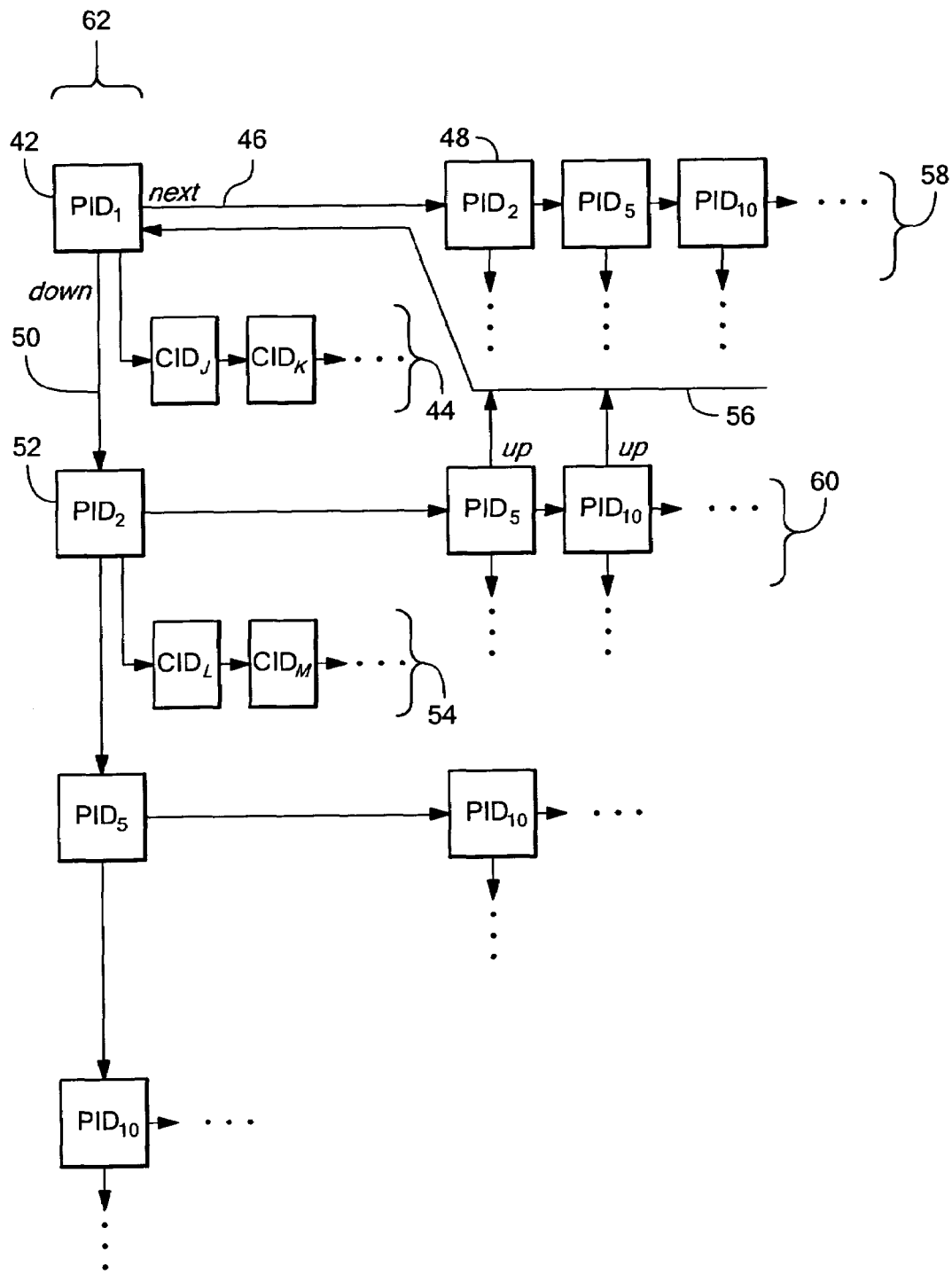
FIG. 4 is a block diagram showing a category index tree in an illustrative embodiment.

FIG. 4 shows the structure of a category index tree that is used to determine the set of categories for which an information item is a candidate member in an illustrative embodiment. The specific structure of the category index tree reflects a currently defined set of information categories. Each node in the category index tree is the root of a sub-tree within the category index tree. Each node in the category index tree is associated with a property identifier and a list of category identifiers, shown for purposes of illustration by the category identifier list 44 for node 42, and the category identifier list 54 for node 52. The category identifiers in each list of category identifiers follow a global category ordering, which may be defined using any specific ordering technique. The combined category lists for all nodes in any given sub-tree do not repeat a category identifier. The category lists for each node in the top row 58 indicate those categories that refer to at least the single property associated with the node. The category list for each node in the second row 60 indicate those categories that refer to at least the single property associated with the node and the property of the ancestor node immediately above the node.

Each row and each column of each sub-tree in the category index tree of FIG. 4 are made up of nodes associated with properties arranged in increasing order based on the global property ordering discussed above with reference to FIGS. 2 and 3. Each lower row of a given sub-tree, and each rightward column, begins with the next ordinal property in the global property ordering. For purposes of explanation, a global property ordering is assumed that begins $PID_1$, $PID_2$, $PID_5$, $PID_{10}$, etc. Accordingly, row 58 begins with a node 42 for the property having $PID_1$, row 60 begins with a node 52 for the next property in the global ordering, in this case the property having $PID_2$, and so forth. Similarly, each column of a category index sub-tree begins with the next ordinal property in the global property ordering, such that a first column 62 for the sub-tree having node 42 as its root node includes nodes associated with $PID_1$, $PID_2$, $PID_5$, etc., while a first column for the sub-tree having node 48 as its root node includes nodes associated with associated with $PID_2$, $PID_5$, $PID_{10}$, etc.

A next link for a node indicates the subsequent node in the current row, and a down link indicates a subsequent node in the current column. For example, the next link 46 of the node 42 indicates the node 48, which is the node subsequent to node 42 in row 58. Similarly, the down link 50 of the node 42 indicates the node 52, which is the node subsequent to node 42 in column 62. Each node further includes an up link indicating the root of the current sub-tree.

During operation of an embodiment of the disclosed system, in order to determine the information categories for which a current information item is a candidate member, the category index tree of FIG. 4 is traversed based on the ordered list of properties for that information item. During such a traversal, each node visited has a list of information categories for which the current information item may be a candidate member. The traversal moves from any given node either to a next node in the current row (next), a lower node in the current column (down), or back to the first node in the row immediately above the current row (up). The disclosed system traverses only those nodes whose category lists identify categories for which the current information item can be a candidate, and avoids nodes including information categories in their category lists for which the current information item cannot be a candidate.

Figure 5:
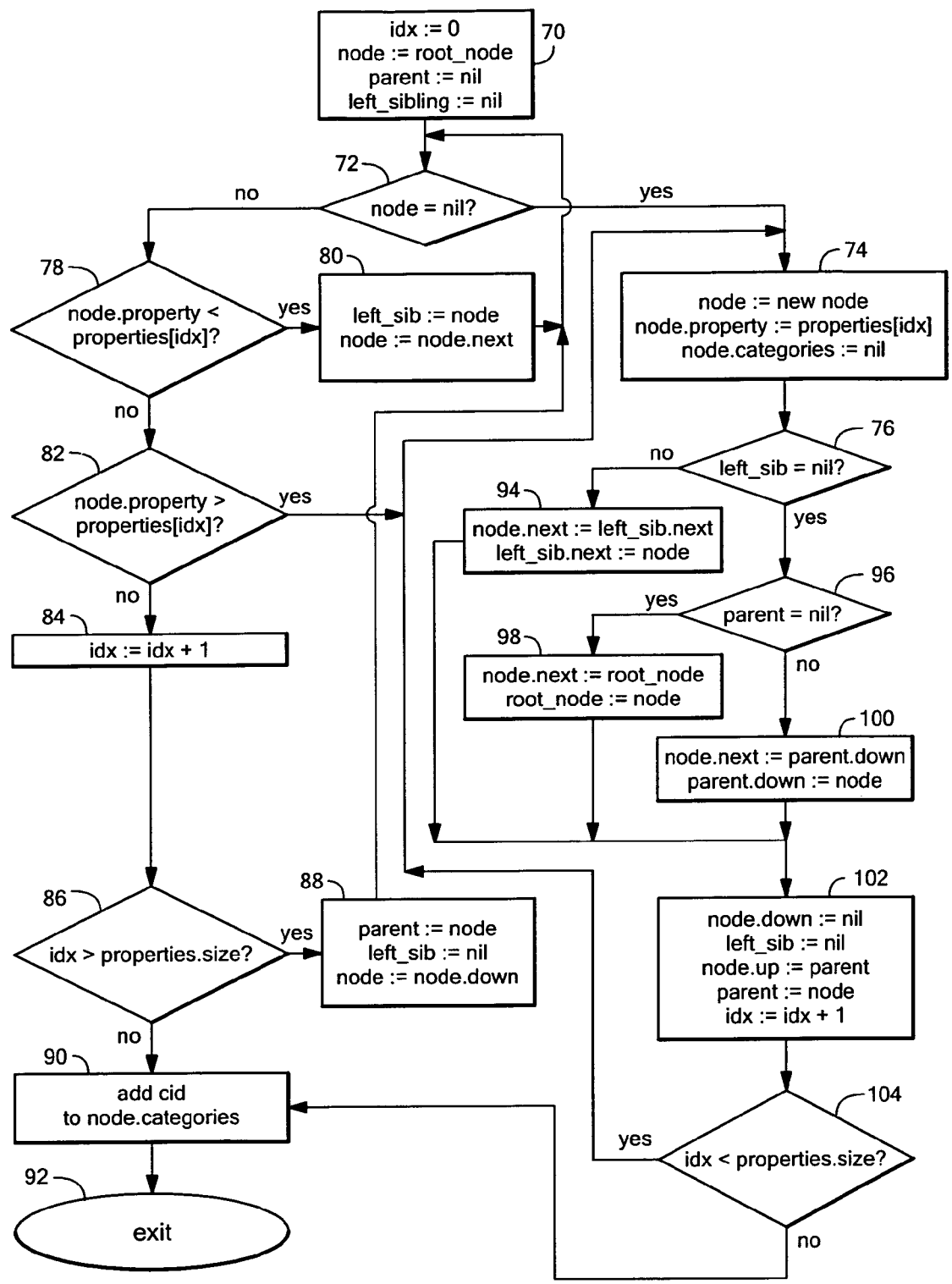
FIG. 5 is a flow chart illustrating steps performed to generate a category index tree in an embodiment of the disclosed system.

FIG. 5 is a flow chart illustrating steps performed in an illustrative embodiment of the disclosed system to form the category index tree of FIG. 4. The steps of FIG. 5 include pseudo-code instructions descriptive of the actions performed therein. The steps of FIG. 5 are performed to identify a node in the category index tree having a category list into which a category identifier (cid) should be added for a new category. For example, the steps of FIG. 5 may be performed as at least part of a function or procedure add_category(cid, properties[], root_node), where cid is the identifier of a new category, properties[] is an array of properties needed to determine membership in the new category, and root_node is a root node of the category index tree of FIG. 4.

At the initial step 70, an index variable idx is set to 0, a current node variable node is set to indicate root_node, a parent node variable parent is set to nil, and a left_sib variable is also set to nil. At step 72 the node variable is compared to nil. If node is equal to nil, step 72 is followed by step 74. Otherwise, step 72 is followed by step 78. The properties array is used in the flow of FIG. 5 to store property identifiers for all properties necessary for an information item to be a candidate member of the new category. The property identifiers in the properties array are ordered based on the global properties ordering described above.

At step 78, a determination is made as to whether the property associated with the node indicated by node is lower in the global properties ordering than properties[idx]. If so, step 78 is followed by step 80, in which left_sib is assigned the current value of node, and node is assigned the next link of node. Otherwise, step 78 is followed by step 82, in which a determination is made as to whether node.property is higher in the global properties ordering than properties[idx]. If so, then step 82 is followed by step 74. Otherwise, step 82 is followed by step 84, in which idx is incremented.

At step 86, a determination is made as to whether idx is less than the size of the properties array. If so, step 86 is followed by step 88, in which parent is assigned the value of node, left_sib gets nil, and node gets node.down. Step 88 is followed by step 72. Otherwise, if idx is not less than the size of the properties array, step 86 is followed by step 90, in which cid is added to the categories list of the current node (node.categories).

At step 74, node is set to point to a newly allocated node, node.property is set to properties[idx], and node.categories gets nil. At step 76, a determination is made as to whether left_sib equals nil. If so, step 76 is followed by step 96. Otherwise, step 76 is followed by step 94, in which node.next is assigned left_sib.next, and left_sib.next is assigned node. Step 94 is followed by step 102.

At step 96, parent is compared to nil. If parent equals nil, then step 96 is followed by step 98, in which node.next gets root_node, and root_node gets node. Otherwise, in step 100 node.next is assigned parent.down, and parent.down is assigned node. Steps 98 and 100 are followed by step 102.

Step 102 includes assignment of nil to node.down and left_sib, as well as assignment of parent to node.up, assignment of node to parent, and incrementing of idx. Following step 102, a determination is made at step 104 as to whether idx is less than properties.size. If not, step 104 is followed by step 90, in which cid is added to the category list for the current node (node.categories). If so, step 104 is followed by step 74.

Figure 6:
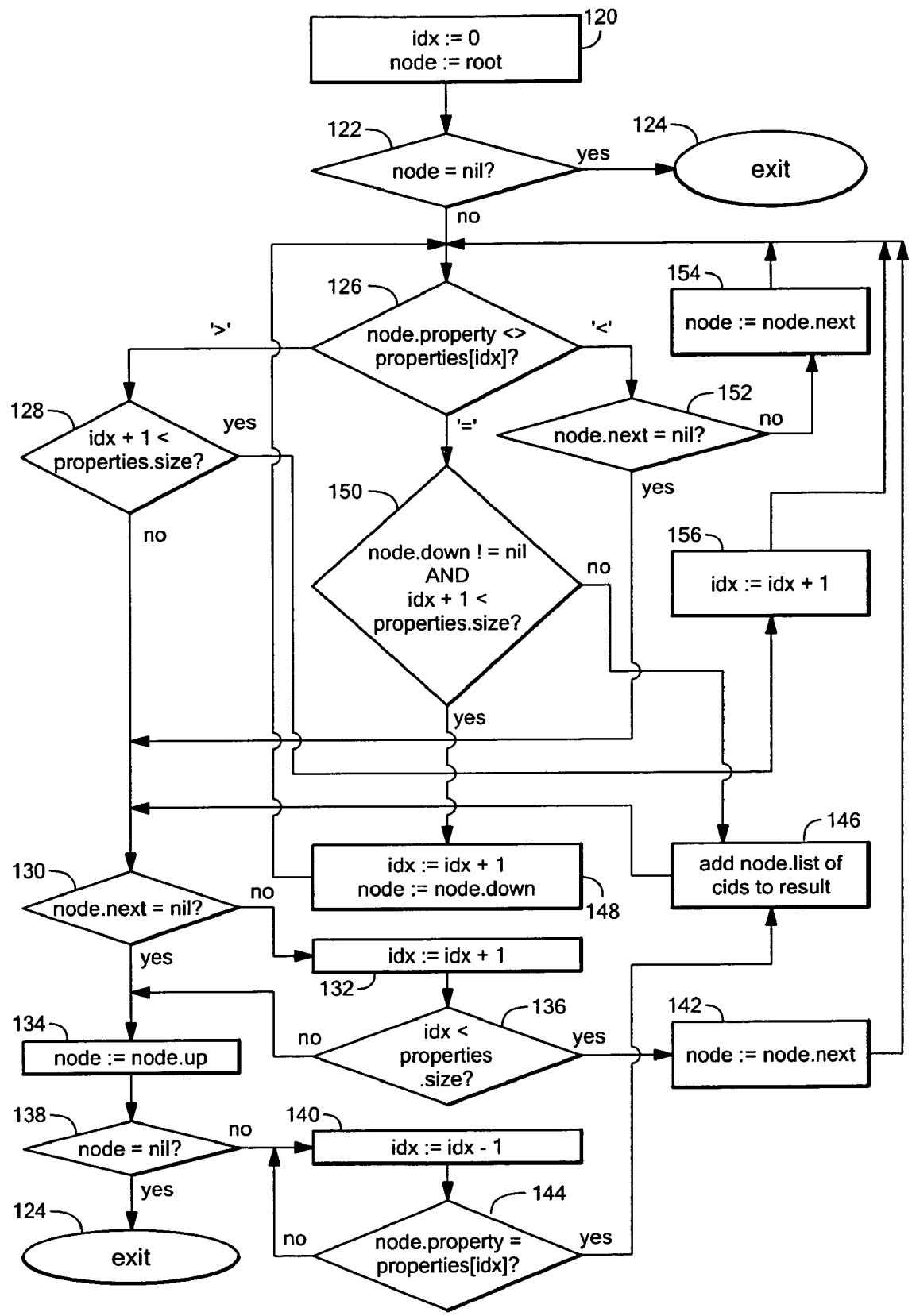
FIG. 6 is a flow chart illustrating steps performed to determine the set of information item categories for which an information may be a candidate member in an illustrative embodiment.

FIG. 6 is a flow chart illustrating steps performed in an illustrative embodiment of the disclosed system to find information categories for which an information item may be a candidate member, based on the category index tree of FIG. 4. The steps of FIG. 6 include pseudo-code instructions descriptive of the actions performed therein.

The steps of FIG. 6 are performed to obtain a result list (result) indicating those categories that an information item having a given set of properties (properties[]) can be a member of. For example, the steps of FIG. 6 may be performed as at least part of a function find_categories(root, properties[]), that returns the category list result, where root is a root node of the category index tree of FIG. 4.

The steps of FIG. 6 illustrate how an embodiment of the disclosed system backtracks from a last node on the right of a row in the category index tree if there has been no match between a property of a node in the row and a current property in an information item property list. The process of FIG. 6 also backtracks if it encounters a node associated with a property that is higher in order than the property it is currently trying to match. In addition, if the process of FIG. 6 matches a property for a current node to a current property in the information item property list, it moves down from that current node prior to moving to a next node in the current row.

As shown in FIG. 6, at step 120 an index variable idx is set to zero, and a current node variable node is set to root. At step 122, node is compared to nil. If node equals nil, then step 122 is followed by exit point 124. Otherwise, step 122 is followed by step 126, in which the property associated with the current node (node.property) is compared to the current property in the information item property list (properties[idx]). If node.property is higher in the global property ordering than properties[idx], then step 126 is followed by step 128. If node.property is lower in the global property ordering than properties[idx], then step 126 is followed by step 152. If node.property equals properties[idx], then step 126 is followed by step 150.

At step 128, the value of idx+1 is compared to the size of the properties array (properties.size), in order to determine if the end of the properties array has been reached. If idx+1 is less than properties.size, then step 128 is followed by step 156, in which idx is incremented, and which is followed by step 126. Otherwise, if idx+1 is not less than properties.size, then step 128 is followed by step 130, in which node.next is compared to nil. If node.next is equal to nil, then at step 134 node is assigned node.up. Otherwise, if node.next is not equal to nil, then at step 132 idx is incremented, and at step 136 idx is compared to properties.size. If idx is less than properties.size, step 136 is followed by step 142, in which node gets node.next, and which is in turn followed by step 126. If idx is not less than properties.size, step 136 is followed by step 134.

Following step 134, at step 138 node is compared to nil. If node equals nil, then 138 is followed by exit point 124. Otherwise, step 138 is followed by step 140, in which idx is decremented, and then by step 144, in which node.property is compared to properties[idx]. If node.property equals properties[idx], then at step 146 the list of categories (node.list) is added to the result list. Step 146 is followed by step 130. Otherwise, if node.property does not equal properties[idx], then idx is decremented again at step 140, and step 144 is repeated.

Step 150 of FIG. 6 determines whether node.down is not nil, and whether idx+1 is less than properties.size. If both these conditions are true, then step 150 is followed by step 148, in which idx is incremented, and node assigned node.down. Step 148 is followed by step 126. If either condition checked at step 150 is not true, then step 150 is followed by step 146, in which the properties list for the current node (node.list) is added to the result list result.

Step 152 of FIG. 6 determines whether node.next is nil. If so, step 152 is followed by step 130. Otherwise, step 152 is followed by step 154, in which node is assigned node.next, and which in turn is followed by step 126.

Those skilled in the art will recognize that the specific ordering and arrangement of steps in FIGS. 5 and 6, as well as the specific pseudo-code instructions therein, are given solely for purposes of illustration, and that the present invention is not limited thereto. Accordingly, other specific arrangements of steps and logical instructions or the like may be used in the alternative, consistent with various embodiments of the present invention.

Figure 7:
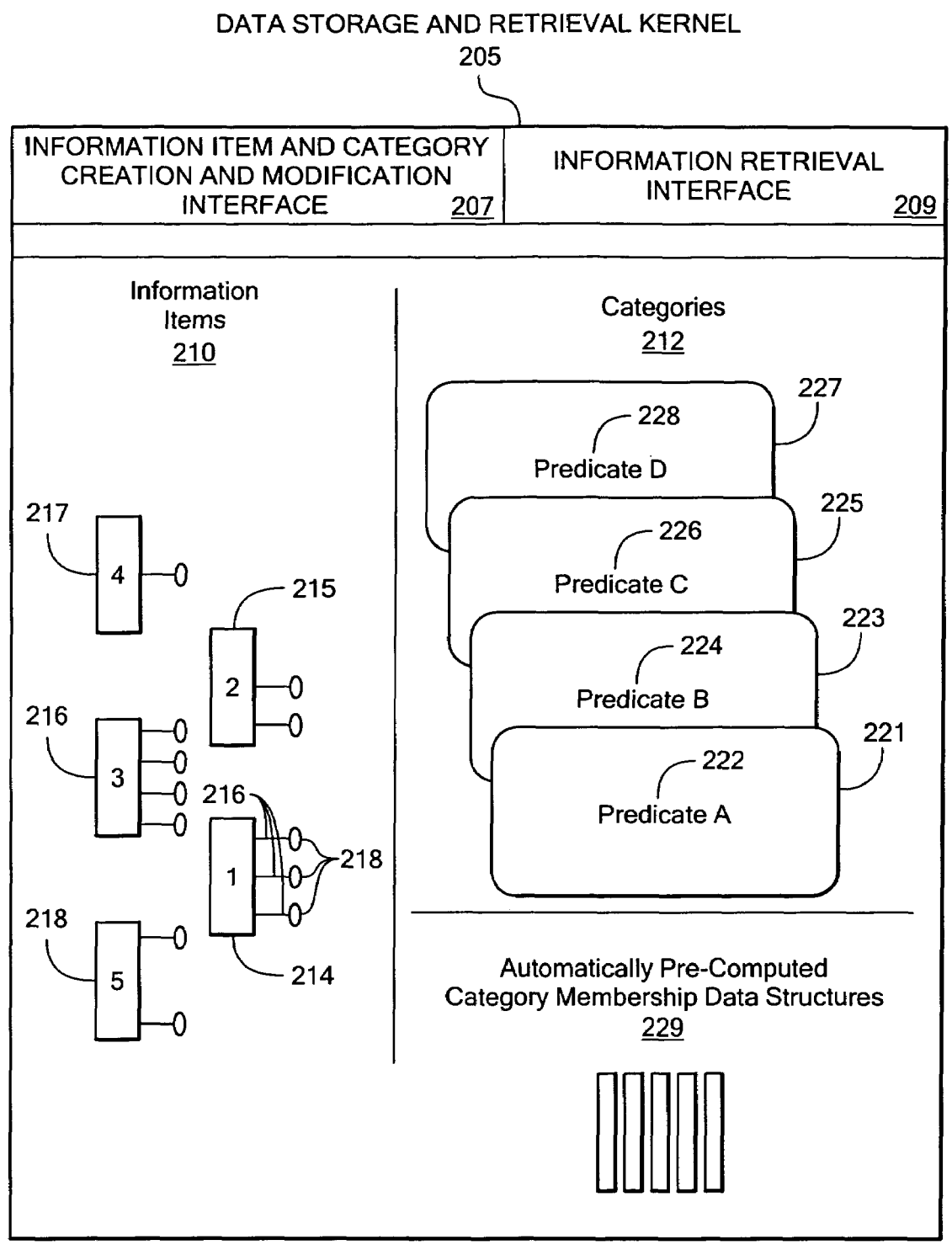
FIG. 7 is a block diagram illustrating category and information item components of an embodiment of the disclosed system.
Figure 8:
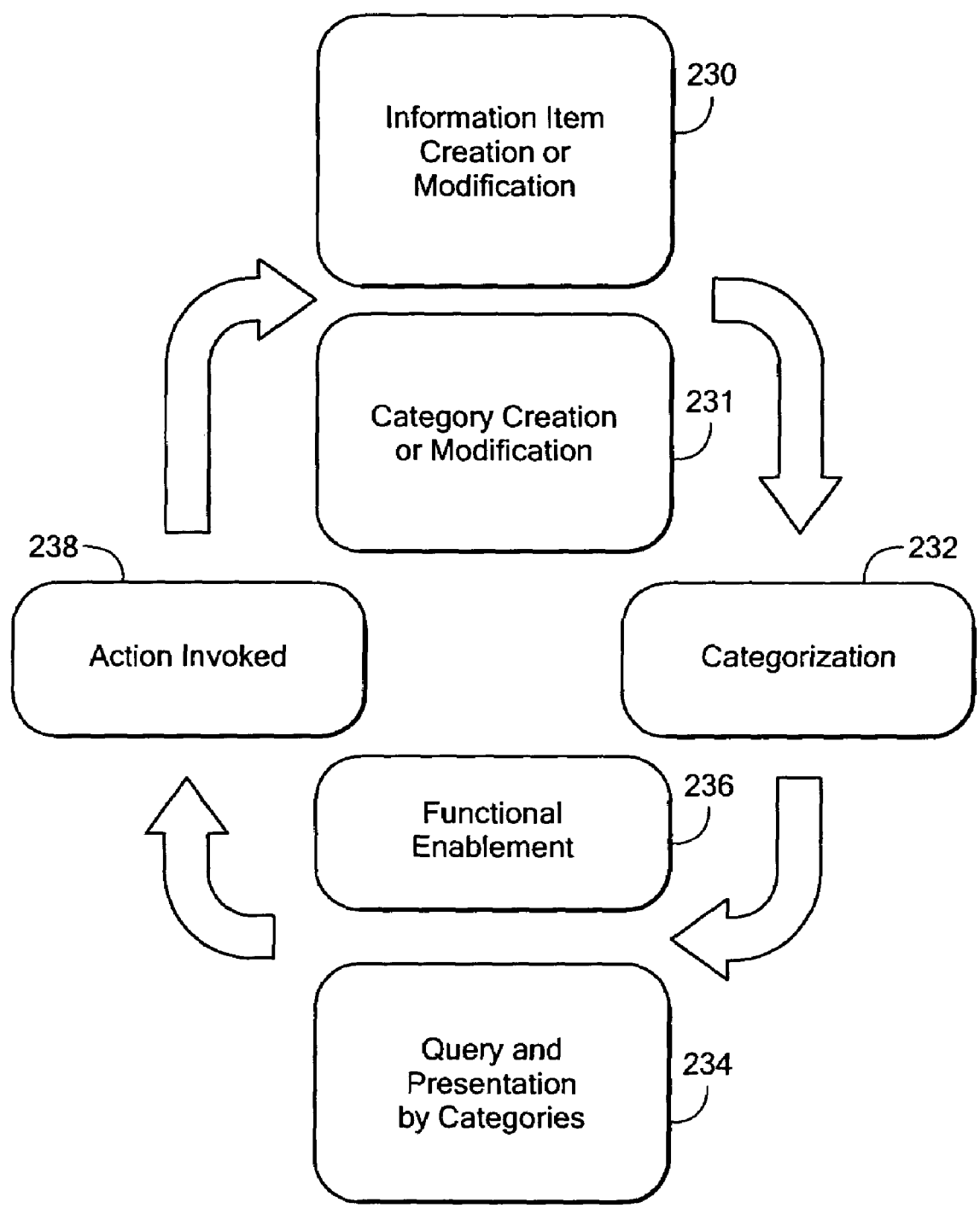
FIG. 8 is a flow chart illustrating operation of an embodiment of the disclosed system.

FIGS. 7-8 show aspects of an embodiment of the disclosed system in a data storage and retrieval system. As shown in FIG. 7, components in an embodiment of the disclosed system in a data storage and retrieval kernel 205 include an information item and category creation and modification interface 207, an information retrieval interface 209, a number of Information Items 210, and a number of Categories 212. The Information Items 210 and Categories 212 are stored separately, in that they are logically independent, and the Categories 212 maintain no references (e.g. pointers) to or identifications (e.g. names) of the items they include. Advantageously, the structures of the information items within the Information Items 210 may be highly variable. First, different ones of the Information Items 210 may include different numbers of properties having associated values. Thus the Information Items 210 may each have different numbers of properties. Additionally, the number of properties for a given one of the Information Items 210 may change over time. For purposes of illustration, the Information Item 214 is shown including Properties 216, each having a corresponding one of the Values 218. Values of the properties for the Information Items 210 may also change dynamically.

The Information Items 210 may include any specific types of information. In one embodiment, the Information Items 210 include personal information maintained by individuals themselves during and/or for their general, daily, and/or professional activities, and the properties of each of the Information Items 210 may accordingly include corresponding personal information properties. Such personal information properties may, for example, include various types of contact information, such as postal addresses, electronic mail addresses, telephone numbers, persons' names, and any other type of contact information. Personal information properties may further include information regarding personal activities, to do lists, schedule information including appointment dates and times, and any other type of personal information. The preceding examples of personal information properties are given only for purposes of explanation, and the disclosed system is not so limited. Accordingly, the disclosed system may be implemented in embodiments using any other specific type of personal information, or any other non-personal information.

Each of the categories 212 includes or is associated with a predicate, which may be embodied as a software routine or software routine with a Boolean result. The predicate for a category provides a test for an information item to which the predicate is applied. If an information item passes the test defined by the predicate of a category, then the information item is considered to be contained within the category, and an association may be formed between the information item and the category. The disclosed system uses "intensional" category assignment, in that each category includes a predicate which, applied to an information item, logically returns true or false with respect to whether the information item belongs in that category. This approach is distinct from previous "extensional" approaches, which rely on information item identities and categories that include the information item lists. In traditional relational databases, only extensional categorization has been supported, represented by the table membership of the records in the database. Such existing systems have not supported testing of the contents of a record to determine which table it belongs to.

General definitions for "intensional definition" may be found in various sources. In the area of logic, an intensional definition gives the meaning of a term by giving all the properties required for something to fall under that definition—the necessary and sufficient conditions for belonging to a set being defined. One example of an intensional definition of "bachelor" is "unmarried man." This is because being an unmarried man is an essential property of something referred to as a bachelor. Being an unmarried man is a necessary condition of being a bachelor—one cannot be a bachelor without being an unmarried man. Being an unmarried man is also a sufficient condition of being a bachelor—any unmarried man is a bachelor. The intensional definition approach is opposite to the extensional definition approach, which defines by listing everything falling under a definition. Accordingly, an extensional definition of "bachelor" would be a listing of all the unmarried men in the world. In this regard, intensional definitions are best used when something has a clearly-defined set of properties, and work well for sets that are too large to list in an extensional definition. Moreover, it is impossible to give an extensional definition for an infinite set, but an intensional one can often be stated concisely. For example, while the infinite number of even numbers makes them impossible to list, they can be defined intensionally by saying that even numbers are integer multiples of two.

The predicates used in the assignment process provided by the disclosed system advantageously provide intensional definitions for corresponding ones of the categories 212. Accordingly, each predicate of the disclosed system tests the properties of an information item to determine if that information item belongs to the category defined by the predicate. The intensional definition of categories in the disclosed system enables categorization of information items at run time, and accordingly allows information items to dynamically change their categorical membership. The disclosed system enables checking information items at any time to determine whether they have changed category membership. Each category must accordingly at least include a category name and a predicate which can be applied to an information item to determine if the information item belongs to the category.

In the embodiment of FIG. 7, each of the categories 212 has a corresponding predicate. Thus category 221 corresponds to Predicate A 222, category 223 corresponds to Predicate B 224, category 225 corresponds to Predicate C 226, and category 227 corresponds to Predicate D 228. While for purposes of concise illustration, only four example categories are shown in the categories 212 of FIG. 7, the disclosed system is not so limited, and may be embodied using any specific number of categories.

The predicates for the categories 212 may each be satisfied by a different set of the information items 210. If one of the information items 210 satisfies any one of the predicates for the categories 212, it may be considered as belonging to the corresponding category for any processing or handling that might be associated with that corresponding category at any point during the processing of that information item. Additionally, if one of the information items 210 satisfies a predicate for one of the categories 212, then that information item can be included when all the members of the category are enumerated or otherwise processed at any point.

The information item and category creation and modification interface 207 permits information items 210 to be created and/or modified dynamically, and independently permits categories 212 to be created dynamically. The interface 207 may be embodied to allow information item creation and/or modification operations to be performed directly or indirectly by a user, for example in an embodiment where the disclosed system stores personal information for that user. Such user controlled actions may, for example, be provided by through graphical user interface (GUI) or the like associated with or provided by the interface 207. The interface 207 may also or alternatively allow information item creation and/or modification by software programs and/or processes external to the data storage and retrieval kernel 205. Such actions may, for example, be provided through an application programming interface (API) or the like associated with or provided by the interface 207.

In a preferred embodiment, item modifications are provided in two different ways, depending on how categories are configured. Synchronous categories require that item modification operations are reflected immediately in the results of any subsequent information retrieval operations. In this way, a category can be configured such that when an item modification affecting the membership of that category returns a completion status, all subsequent queries will return results that completely reflect that modification. Asynchronous categories do not require immediate consistency with the modifications in subsequent information retrieval operations.

The information retrieval interface 209 permits retrieval of information items 210 dynamically and independently from the categorization of the information items 210 based on the categories 212. The interface 209 may be embodied to allow information item retrieval to be performed directly or indirectly by a user, for example in an embodiment where the disclosed system stores personal information for that user. Such user controlled actions may, for example, be provided by through graphical user interface (GUI) or the like associated with or provided by the interface 209. Information item retrieval through the interface 209 is accomplished in a preferred embodiment based on input information retrieval queries including one or more category names associated with corresponding ones of the categories 212. The information items returned in response to such queries reflect the categorization of information items 210 based on the ones of categories 210 indicated by the category names contained in such queries. The interface 209 may be embodied such that any specific query language, including but not limited to SQL (Structured Query Language), extensions to SQL, or the like, may be used to indicate the information items to be retrieved. The interface 209 may also or alternatively allow information item retrieval by software programs and/or processes external to the data storage and retrieval kernel 205. Such actions may, for example, be provided through an application programming interface (API) or the like associated with or provided by the interface 207.

Automatically pre-computed category membership data structures 229 may be used to support the information item retrieval interface 209 in order to provide better response times for queries, including those queries that may use category definitions as part of the query. The data structures 229 may be created or modified automatically, synchronously or asynchronously, in response to the items or categories being created or modified via the information and category creation and modification interface 207.

Any application may operate using or based on the dynamic categorizations provided by the disclosed system. For example, in one embodiment, a search application or tool may operate to perform searches and apply rankings of the search results based on categorizations of information items provided by the disclosed system. In such an embodiment the search tool might respond to a search query by searching only for information items belonging to some combination of categories 212.

Any specific intensional definition can be used in the predicates for the categories of the disclosed system. For example, a predicate may test an information item for the existence in an information item of all properties in a set of one or more properties. Or, a predicate may test an information item for the presence of at least one property within a set of properties. Another type of predicate may test the cardinality of certain properties. Such a predicate may test whether an information has a specific property, and whether the information item has some predetermined number of values for that property. If the information item does not have the predetermined number of values for the property, then such a predicate is not satisfied.

The disclosed system may further include value-based predicates, which test for certain property values. Value-based predicates may test any specific property for any specific value. For example, these predicates may test whether a Boolean property has a true or a false value, whether a zip code property has a certain zip code value, whether a price property has a value between a minimum and a maximum price, whether a date property is between a starting date and an ending date, etc.

Another type of predicate that may be used in an embodiment of the disclosed system tests one or more referential properties of an information item. These predicates test whether a value of a property is a reference (e.g. pointer) to another information item belonging to a specified category or set of categories.

The above described predicate examples are given for purposes of explanation only, and those skilled in the art will recognize that the disclosed system is not limited to those specific types of predicates, and that other types of predicates may readily be used in the alternative or additionally.

The intensional category definitions of the disclosed system may associate various combinations of information items into categories. For example, with reference to FIG. 7, Category 221 has Predicate A 222, which may be satisfied by Information Item 1 214 and Information Item 2 215. Category 223 has Predicate B 224, which may be satisfied by Information Item 1 214, Information Item 4 217, and Information Item 5 218. Category 225 is shown having Predicate 226, which may be satisfied by none of the Information Items 210, and Category 227 has Predicate 228, which may be satisfied by all of the Information Items 210. Over time, the specific ones of Information Items 210 that satisfy specific ones of the predicates for the Categories 212 may change as the properties of the Information Items 210 change.

The previous examples are given for purposes of explanation only, in order to illustrate the categorization process of the disclosed system. Accordingly, predicates within an embodiment of the disclosed system may operate to categorize information items across specific categories in various specific combinations.

As shown in FIG. 8, information items may pass through a series of steps or actions 230, 231, 232, 234, 236, and/or 238. At step 230, the information items are either created, or subsequently modified. Information items may, for example, be created by being manually inserted by a user through a user interface, or by being automatically inserted as a result of information received over network. At step 231, categories are either created, or subsequently modified. Categories may, for example, be created or modified as a result of installation of an application program, activities performed during execution of an application program, user activities, and/or other events. By providing for on-going introduction of new and modification of existing categories, the disclosed system allows for dynamic participation of newly created, modified, or previously existing information items in one or more new or modified categories. A categorization step 232 then applies the predicate or predicates associated with one or more categories to the information items, in order to assign each information item to one or more categories. Step 232 may, for example, be performed at the same time as creation/modification, or at any subsequent point in time. The categorization of an information item may reflect the run time addition of or modification to one or more properties of the information item (in step 230 for example), and/or the run time addition of or modification to one or more categories (in step 231 for example), independent of the categorization step 232. Advantageously, the categorization step 232 may be performed automatically, independent and asynchronous with respect to the creation and/or modification of the information items, and/or with respect to the creation and/or modification of categories, allowing significant performance optimizations.

The assignment of items to one or more categories may be embodied in various ways. For example, a number of automatically pre-computed category membership data structures may be created or modified at step 232. These data structures may be used subsequently for efficiently identifying items to be retrieved that satisfy queries expressed at least in part using the category definitions.

At step 234, the automatically computed data structures from step 232 may be used to support user operations or information rendering, such as category specific processing of user queries or requests, and/or category specific presentation of information items to the user based on category. For example, a user can request a retrieval and display of all information items relating to one or more categories that was applied at step 232. Additionally, the categorization at step 232 may enable a user to conveniently request and obtain a display of all information items related to a category for a specific work project, one or more application programs, or any other relevant category.

The categories associated with the information items at step 232 may also or alternatively be used to facilitate application of certain functionality to the information items at step 236, independent from and transparent to the user. In one example, where a category is used to identify those information items associated with an electronic mail ("email") application, the presence of an indication of a destination email address property within the information item may satisfy the associated predicate. Satisfaction of such a predicate may be based on a pattern matching function that tests the information item for the existence of any specific property denoting a destination email address. If such a property exists on the information item, the category forms an association between the information item and the email application, or provides an indication that the information item is associated with the email application. Accordingly, based on the categorization provided at step 232, possibly in response to detection of a destination email address property or the like as a property in an information item, functionality provided at step 236 may responsively present a SEND button display object to the user within a graphical user interface while the user is viewing that information item. Or, in the case where the SEND button display object had previously been grayed out, the disclosed system may operate to un-gray the button in response to the categorization at step 232 when the user is viewing such an information item. Thus an information item initially created as a text processing document, which has subsequently had attached to it a destination email address property or the like, may be automatically categorized as an email document, and based on that categorization can be subsequently treated by other applications as an email message. Those skilled in the art will recognize that various other specific function may be provided at step 236 in response to the specific categorization performed at step 232 for an information item.

Properties or values of the information items, such as the above described destination email address property, may be added to, modified, or removed from information items during information modification at step 230, and/or in response to various user actions performed at step 238. Thus the disclosed system provides an application independent information item categorization step at step 232. The item categorization at step 232 operates using intensional category predicates independent from any subsequent use of the categories associated with the information items, and also independent from the step of modifying the information items. As an information item is recognized as a member of a new category, the overall system gains any resulting advantages that come with being able to treat the item as a member of the new category. Such benefits of newly determined category membership may make the information item more useful, or more easily accessible for certain purposes. Certain categories might be more significant for certain applications, and may result in a reduction in the amount of work in terms of how the information item is retrieved.

The disclosed system advantageously provides performance improvements in an information storage and retrieval system. The disclosed system avoids any need to check all possible categories in response to a single modification to an information item. The disclosed system reduces the time necessary to complete dynamic categorization in response to a data modification. In one embodiment of the disclosed system, once a category definition is made, that category is never changed and never removed. Though this may result in an increasing total number of information categories, for example as applications or users provide new or modified category definitions, the resulting adverse performance impact is minimized through the disclosed category selection process.

The disclosed category index tree is a structure that enables determination of a information item's information category membership while minimizing the number of categories checked. The disclosed category index tree indexes category definitions based on the properties used by the category definitions. In one embodiment, category definitions are logical predicates defined against properties of information items. Any given predicate of a corresponding category uses certain properties of each candidate information item to determine whether the information item is a member of the category. Thus, in such an embodiment, the predicate for the category defines which properties an information item must have to be a member of the category. The set of interesting properties for a given category is therefore the set of properties that the predicate for that category refers to. If an information item does not contain any one of these properties, it is not a valid candidate for that category. The disclosed system uses this fact to perform category filtering that avoids the need for checking category membership if the information item lacks one of the properties that is to be checked by the relevant predicate.

For example, if an information item relates to electronic mail ("email") message, the properties it has may include TO, CC, SUBJECT, BODY, and ATTACHMENTS. These properties are different from those of an personal contact information item relating to an address book, which may include properties such as NAME, TELEPHONE, FAX, and ADDRESS. Accordingly, if a category definition includes a predicate that identifies certain information items that are parts of email messages, the disclosed system enables the elimination of that category from consideration when a personal contact information item is categorized.

While the above description involves categories, information items, and properties, those skilled in the art will recognize that it is not limited to such an embodiment. The disclosed system is broadly applicable to the problem of efficiently finding sets from a set of sets, which are in turn subsets of a given set. Given the following:

X—a set of symbols
Y—a set of finite subsets of X
Ω—a subset of Y
T—an element from Y the disclosed system generally provides a representation of Ω, and an algorithm which efficiently finds those r in Ω, such that r is a subset of T.

FIGS. 1-8 are block diagram and flowchart illustrations of methods, apparatus(s) and computer program products according to an embodiment of the invention. It will be understood that each block of FIGS. 1-8, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures. Accordingly, the invention should not be viewed as limited except by the scope and spirit of the appended claims.

I claim:

1. A method of categorizing information items in a computer implemented data storage and retrieval system, wherein each of said information items is associated with at least one property, comprising:

applying a global property ordering to each list of properties required for membership in each corresponding one of a currently defined set of categories;

generating, a tree structure providing an index, wherein said tree structure indexes said currently defined set of categories based on said properties required for membership in corresponding ones of said categories, wherein said tree structure includes a plurality of nodes, each node being associated with an individual property and a list of categories, wherein said nodes are ordered within said tree structure based on said global property ordering, and wherein each category in said category list for each node is a category that requires the property associated with the node as well as the properties associated with all ancestor nodes of the node in the up direction for membership in that category;

receiving an input one of said information items;

selecting a subset of said defined set of categories to be checked by ordering all properties associated with said input information item into an ordered property list based on said global property ordering and traversing said tree structure according to said ordered property list, wherein said traversing is limited to subtrees of said tree structure having nodes associated with properties in said ordered property list, wherein subtrees of said tree structure having nodes not associated with properties in said ordered property list are not traversed; and categorizing said information item based on said selected subset of categories by checking the properties in said ordered list of properties to determine whether conditions for membership in each of said selected subset of categories are met, wherein conditions for membership in those categories not within said selected subset of categories are not checked.

2. The method of claim 1, wherein said selecting is performed responsive to receipt of said information item.

3. The method of claim 1, wherein said selecting is performed responsive to deletion of said information item.

4. The method of claim 1, wherein said selecting is performed responsive to modification of said information item.

5. A computer system for categorizing information items in a data storage and retrieval system, wherein each of said information items is associated with at least one property, said system including a computer readable memory having program code stored thereon, said program code comprising:

program code for applying a global property ordering to each list of properties required for membership in each corresponding one of a currently defined set of categories;

program code for generating a tree structure providing an index, wherein said tree structure indexes said currently defined set of categories based on said properties required for membership in corresponding ones of said categories, wherein said tree structure includes generating a plurality of nodes, each node being associated with an individual property and a list of categories, wherein said nodes are ordered within said tree structure based on said global property ordering, and wherein each category in said category list for each node is a category that requires the property associated with the node as well as the properties associated with all ancestor nodes of the node in the up direction for membership in that category;

program code for receiving an input one of said information items;

program code for selecting a subset of said defined set of categories to be checked by ordering all properties associated with said input information item into an ordered property list based on said global property ordering, and traversing said tree structure according to said ordered property list, wherein said traversing is limited to subtrees of said tree structure having nodes associated with properties in said ordered property list, wherein subtrees of said tree structure having nodes not associated with properties in said ordered property list are not traversed; and program code for categorizing said information item based on said selected subset of categories by checking the properties in said ordered list of properties to determine whether conditions for membership in each of said selected subset of categories are met, wherein conditions for membership in those categories not within said selected subset of categories are not checked.

6. The system of claim 5, wherein said program code for selecting is responsive to receipt of said information item.

7. The system of claim 5, wherein said program code for selecting is responsive to deletion of said information item.

8. The system of claim 5, wherein said program code for selecting is responsive to modification of said information item.

9. A computer program product including a computer readable memory, said computer readable memory having a computer program for categorizing information items in a data storage and retrieval system stored thereon, wherein each of said information items is associated at least one property, said computer program comprising:

program code for applying a global property ordering to each list of properties required for membership in each corresponding one of a currently defined set of categories;

program code for generating a tree structure providing an index, wherein said tree structure indexes said currently defined set of categories based on said properties required for membership in corresponding ones of said categories, wherein said tree structure includes generating a plurality of nodes, each node being associated with an individual property and a list of categories, and wherein said nodes are ordered within said tree structure based on said global property ordering, and wherein each category in said category list for each node is a category that requires the property associated with the node as well as the properties associated with all ancestor nodes of the node in the up direction for membership in that category;

program code for receiving an input one of said information items;

program code for selecting a subset of said defined set of categories to be checked by ordering all properties associated with said input information item into an ordered property list based on said global property ordering, and traversing said tree structure according to said ordered property list, wherein said traversing is limited to subtrees of said tree structure having nodes associated with properties in said ordered property list, wherein subtrees of said tree structure having nodes not associated with properties in said ordered property list are not traversed; and program code for categorizing said information item based on said selected subset of categories by checking the properties in said ordered list of properties to determine whether conditions for membership in each of said selected subset of categories are met, wherein conditions for membership in those categories not within said selected subset of categories are not checked.

10. A computer system including at least one processor and a computer readable storage medium, wherein said computer readable medium has stored thereon program code for categorizing information items in a data storage and retrieval system stored on said computer readable medium, wherein each of said information items is associated at least one property, wherein said program code for categorizing information items comprises:

means for applying a global property ordering to each list of properties required for membership in each corresponding one of a currently defined set of categories;

means for generating a tree structure providing an index, wherein said tree structure indexes said currently defined set of categories based on said properties required for membership in corresponding ones of said categories, wherein said tree structure includes generating a plurality of nodes, each node being associated with an individual property and a list of categories, wherein said nodes are ordered within said tree structure based on said global property ordering, and wherein each category in said category list for each node is a category that requires the property associated with the node as well as the properties associated with all ancestor nodes of the node in the up direction for membership in that category;

means for receiving an input one of said information items;

means for selecting a subset of said defined set of categories to be checked by ordering all properties associated with said input information item into an ordered property list based on said global property ordering, and traversing said tree structure according to said ordered property list, wherein said traversing is limited to subtrees of said tree structure having nodes associated with properties in said ordered property list, wherein subtrees of said tree structure having nodes not associated with properties in said ordered property list are not traversed; and means for categorizing said information item based on said selected subset of categories by checking the properties in said ordered list of properties to determine whether conditions for membership in each of said selected subset of categories are met, wherein conditions for membership in those categories not within said selected subset of categories are not checked.

* * * * *